United States Patent Office 3,454,670
Patented July 8, 1969

3,454,670
POLYPROPYLENE COMPOSITION HAVING IMPROVED DYE RECEPTIVITY CONTAINING EPICHLOROHYDRIN/DIAMINE/DIPHENOL POLYCONDENSATE
Giuseppe Cantatore and Alberto Bonvicini, Terni, Italy, assignors to Montecatini Edison S.p.A., Milan, Italy, a corporation of Italy
No Drawing. Filed May 9, 1966, Ser. No. 548,388
Claims priority, application Italy, May 14, 1965, 10,891/65
Int. Cl. C08f 29/10
U.S. Cl. 260—837
7 Claims

ABSTRACT OF THE DISCLOSURE

Polymeric composition, having particular receptivity to wool dyestuffs, comprising isotactic polypropylene and 1%–25% by weight thereof of a basic nitrogen polycondensate of epichlorohydrin with a bis-secondary amine and a diphenolic compound. These compositions may be extruded to prepare dyeable textile fibers.

The present invention relates to improvements in the preparation of textile fibers, films, tapes, shaped articles and the like comprising crystalline polyolefins prepared with stereo-specific catalysts and a basic nitrogen compound acting at tinctorial modifier for the said polyolefins, thus making them receptive to dyestuffs.

Prior methods have been described for preparing textile fibers having good receptivity to dyestuffs, which methods consist of extruding mixes of polyolefins with basic nitrogen compounds obtained by condensation of epichlorohydrin with aliphatic amines and with diamines, or by condensation of epichlorohydrin with diamines and successive alkylation with alkyl halides, or by condensation of bis-secondary amines with epichlorohydrin and with halogen derivatives.

The present invention provides a process for preparing polyolefin fibers having a particular receptivity to wool dyestuffs and the products obtained by this process, which products are fibers exhibiting exceptionally solid uniform colors when dyed with dyestuffs, particularly dyestuffs used for dyeing wools, such as for instance acid metallized and disperse dystuffs. Among these dyestuffs the following ones can be mentioned: Alizarine Yellow 2G (C. I. Mordant Yellow) (acid); Wool Red B (C. I. Acid Red 115) (acid); Alizarine Red S (C. I. Mordant Red 3) (acid); Alizarine Blue SE (C. I. Acid Blue 43) (acid); Acid Black JVS (C. I. Acid Black 1) (acid); Lanasyn Yellow GLN (C. I. Acid Yellow 112) (metallized); Lanasyn Red 2GL (C. I. Acid Red 216) (metallized); Lanasyn Brown 2RL (C. I. Acid Brown 30) (metallized); Setacyl Yellow 3G (C. I. Disperse Yellow 20) (Disperse); Cibacet Scarlet Br (C. I. Disperse Red 18) (Disperse); Setacyl Brill. Blue BG (C. I. Disperse Blue 3) (Disperse).

We have now surprisingly found that textile fibers having a particular receptivity to dyestuffs are obtained by extruding mixes of high molecular weight polymers with 1 to 25% by weight of basic nitrogen polycondensates obtained by polycondensation of epichlorohydrin with bis-secondary amines and with diphenolic compounds. Polycondensation products obtained from epichlorohydrin, bis-secondary amines and diphenols have been described in British Patent No. 664,271. The synthesis of the polycondensates used for the tinctorial modification of polyolefins in accordance with the present invention may be carried out by reacting epichlorohydrin with a mixture consisting of a polyamine having from about 4 to 20 carbon atoms and containing two NH groups in its molecule and of a diphenolic compound, in a molar ratio of epichlorohydrin to polyamine diphenol of about 0.9:1 to 1:0.9, preferably 1:1. The ratio of polyamine to diphenol may vary from about 1:9 to 9.1.

Among the various bis-secondary amines which can be used, particularly convenient compounds include: dialkylalkylenediamines, piperazine, 2-methyl-piperazine, 2,5-dimethylpiperazine, N,N'-dimethylethylendiamine, N,N'dibutylhexamethylendiamine, and N,N'-dicyclohexyl-hexamethylendiamine.

Among the diphenolic compounds which can be used, di-(p-hydroxyphenyl) dimethylmethane (bisphenol A) is particularly preferred but pyrocatechol, resorcinol, hydroquinone, and di-(p-hydroxyphenyl) methane can also conveniently be used.

The polycondensates used in the present invention can also be obtained by reacting epichlorohydrin with a bis-secondary amine and diglycidyl derivatives of diphenols. The addition of the basic nitrogen polycondensates to the polyolefin, according to the invention, is generally carried out by simply mixing the polycondensate with the polymer while agitating. The addition, however, can be obtained also by other methods such as mixing the polyolefins with a solution of the polycondensates in a suitable solvent followed by evaporation of the solvent or by addition of the polycondensate to the polyolefin at the end of the polymerization.

It is also possible to apply the polycondensate to the manufactured article, e.g., by immersing the same in a solution or dispersion of the polycondensate and then evaporating the solvent. The addition can be carried out before or after stretching for times from a few seconds to several hours at temperatures varying from room temperature to 10° C. below the softening point of the polymer.

Preferably, textile fibers are made from the mixes by granulating and then extruding them in melt spinning devices preferably of the type described in Italian Patent No. 614,043 and preferably through spinnerets of the type described in Italian Patent No. 600,248 having holes with length/diameter ratios higher than 1. The granulation and spinning of the mixes are carried out by operating in the absence of oxygen, preferably under an inert gas atmosphere (e.g. nitrogen). The spinning can be conveniently carried out in the presence of a small amount of a "solid dispering agent," described in U.S. patent application Ser. No. 8,529, filed Feb. 15, 1960 now abandoned. During the mixing of the polymer with the polycondensates, stabilizers, opacifiers and organic or inorganic pigments can also be added to the polymer-polycondensate mix.

The fibers, after spinning, are subjected to a stretching process, with stretching ratios between 1:2 and 1:10, at temperatures of between 80 and 150° C., in stretching devices heated with hot air, steam or a similar fluid or provided with a heating plate. The fibers can then be subjected to a dimensional stabilization treatment under free or prevented shirinking conditions, at 80–160° C. as described in U.S. Patent No. 3,106,442.

The fibers obtained by extrusion of the mixes of the present invention can be mono- or multifilaments and can be used for preparing continuous, bulk or staple yarns.

If desired, the mono- or multifilaments prepared according to the invention can be subjected to treatments with reactants capable of rendering the nitrogen polycondensates completely water-insoluble. Particularly suitable for this purpose are treatments with mono- and diepoxy compounds, with mono- and diisocyanates, with mono and dialdehydes, with halogens, divinylbenzene and the like, as described in the art. These treatments are carried out before or after stretching. The fibers and other manufactured articles can also be subjected to an acid treatment as described in U.S. Patent No. 3,151,928, which treatment improves the dyeability and ultimately the fastness of the dyed materials.

The composition of the present invention can be used not only for preparing yarns but also for preparing films, tapes, and other shaped articles as described in U.S. patent application 706,283 and U.S. Patent 3,019,507.

The fibers and shaped articles obtained according to the present invention have a remarkable receptivity for acid, metallized and disperse dyestuffs. The fibers obtained by extrusion of the compositions according to the present invention show an increased stability, especially against the action of light.

The dyeings were carried out for 1½ hours at the boiling point in dyebaths containing 2.5% of dyestuff by weight of the fiber, with a fiber/dyebath ratio of 1:40.

The dyeings with acid and metallized dyestuffs were carried out in the presence of 3% of ammonium acetate (by weight of the fibers) and of 1% of a surface active agent consisting of the condensation product of ethylene oxide with an alkylphenol. 30 minutes after the beginning of boiling, 2% (by weight of the fiber) of a 20% acetic acid solution was added in order to improve the exhaustion of the dyebaths.

The dyeings with disperse dyestuffs were carried out in the presence of 2% of surface active agent by weight of the fiber. The fibers, after dyeing, were rinsed with running water and were intensely dyed in the case of acid as well as of metallized or disperse dyestuffs.

The color fastness to light, cleaning with trichloroethylene and to rubbing were very good.

The following examples illustrate the invention without limiting its scope.

Example 1

The following reactants were introduced into a 1-liter three-necked flask provided with an agitator, a thermometer and a reflux condenser:

| | | |
|---|---|---|
| Bisphenol A (0.2 mol) | g | 45.6 |
| Anhydrous piperazine (1 mole) | g | 86.1 |
| Methanol | cc | 375 |

111 g. (1.2 mols) epichlorohydrin were then added dropwise within 1 hour and the resulting mixture heated at 65° C. for 10 hours. During the last 8 hours of heating 48.5 g. NaOH were added. Sodium chloride was separated by filtration and the solvent was then removed from the filtrate by distillation. The polycondensate was then completely dried by heating at 100–110° C. under vacuum (1–2 mm. Hg) for 2 hours. The resin thus obtained was ground and sieved. It was then in the form of a powder having a melting point of 130–140° C.

The analysis showed: Nitrogen (found) 13.6%, (calculated) 14.7%.

45 g. of the product were mixed with 0.951 kg. polypropylene, 3 g. calcium stearate and 1 g. TiO$_2$ at room temperature in a Henschel type mixer. The polypropylene used had the following characteristics:

| | | |
|---|---|---|
| [η]-(determined in tetrahydronaphthalene at 135° C.) | | 1.54 |
| Ash content | percent | 0.012 |
| Residue after heptane extraction | do | 97.2 |

The mix thus obtained was granulated in an extruder under an oxygen-free atmosphere at 220° C. The granulate was spun in a melt spinning device under the following conditions.

Spinning conditions:

| | |
|---|---|
| Screw temperature, ° C. | 250 |
| Head temperature, ° C. | 250 |
| Spinneret temperature, ° C. | 250 |
| Spinneret type, mm. | [1] 60/0.8 x 16 |
| Max. pressure (kg./cm.$^2$) | 71 |
| Winding speed (m./minute) | 520 |

Stretching conditions:

| | |
|---|---|
| Temperature, ° C. | 120 |
| Medium | Steam |
| Stretching ratio | 1:3 |

[1] The expression 60/0.8 x 16 mm. indicates a spinneret with 60 holes, each having a diameter of 0.8 mm. and a length of 16 mm.

After stretching and treatment with a 6% aqueous solution of ethyleneglycol diglycidyl ether followed by heating to 140° C. for 10 minutes, the fibers had the following characteristics:

| | |
|---|---|
| Tenacity (g./den.) | 5.5 |
| Elongation (percent) | 29 |

The fibers were dyeable with acid, metallized and disperse dystuffs, e.g.: Alizarine Yellow 2G (C.I. Mordant Yellow 1) (acid); Wool Red B (C.I. Acid Red 115) (acid); Alizarine Red S (C.I. Mordant Red 3) (acid); Alizarine Blue SE (C.I. Acid Blue 43) (acid); Acid Black JVS (C.I. Acid Black 1) (acid); Lanasyn Yellow GLN (C.I. Acid Yellow 112) (metallized); Lanasyn Red 2GL (C.I. Acid Red 216) (metallized); Lanasyn Brown 2RL (C.I. Acid Brown 30) (metallized); Setacyl Yellow 3G (C.I. Disperse Yellow 20) disperse); Cibacet Scarlet Br (C.I. Disperse Red 18) (disperse); Setacyl Brill.-Blue BG (C.I. Disperse Blue 3) (disperse).

Example 2

The following reactants were introduced into a 1-liter three-necked flask provided with an agitator, a thermometer and a reflux condenser:

| | | |
|---|---|---|
| Bisphenol A (0.15 mol) | g | 34.2 |
| Anhydrous piperazine (1.02 mols) | g | 87.8 |
| Methanol | cc | 350 |

106.4 g. (1.15 mols) of epichlorohydrin were added dropwise within 1 hour and the reaction mixture then heated to 65° C. for 10 hours, while adding 46 g. (1.15 mols) of NaOH during the last 8 hours. Sodium chloride was separated by filtration and methanol was removed from the solution by distillation. The polycondensate was then completely dried by heating at 100–110° C. under vacuum (1–2 mm. Hg) for 2 hours. A resin was obtained which, after grinding and sieving, was in the form of a powder melting at a temperature of about 135–142° C.

Analysis gave the following results: Nitrogen (found) 14.7%, (calculated) 15.1%.

40 g. of this product were mixed with 0.956 kg. of polypropylene, 3 g. of calcium stearate and 1 g. of TiO$_2$ at room temperature in a Henschel type mixer. The polypropylene used had the following characteristics:

| | | |
|---|---|---|
| [η] | | 1.54 |
| Ash content | percent | 0.012 |
| Residue after heptane extraction | do | 97.2 |

The mix obtained was granulated in an extruder under an oxygen-free atmosphere at 220° C. The granulate thus obtained was spun in a melt spinning device under the following conditions.

Spinning conditions:

| | |
|---|---|
| Screw temperature, ° C. | 250 |
| Head temperature, ° C. | 250 |
| Spinneret temperature, ° C. | 250 |
| Spinneret type, mm. | 60/0.8 x 16 |
| Max. pressure (kg./cm.$^2$) | 69 |
| Winding speed (m./minute) | 520 |

Stretching conditions:

| | |
|---|---|
| Temperature, ° C. | 120 |
| Medium | Steam |
| Stretching ratio | 1:3 |

After stretching and treatment with a 6% aqueous ethylene-glycol diglycidyl ether solution followed by heating to 140° C. for 10 minutes, the fibers had the following characteristics:

Tenacity (g./den.) _____ 5.15
Elongation (percent) _____ 32

The fibers appeared to be dyeable with the following dyestuffs: Alizarine Yellow 2G (C.I. Mordant Yellow 1) (acid); Wool Red B (C.I. Acid Red 115) (acid); Alizarine Red S (C.I. Mordant Red 3) (acid); Alizarine Blue SE (C.I. Acid Blue 43) (acid); Acid Black JVS (C.I. Acid Black 1) (acid); Lanasyn Yellow GLN (C.I. Acid Yellow 112) (metallized); Lanasyn Red 2GL (C.I. Acid Red 216) (metallized); Lanasyn Brown 2RL (C.I. Acid Brown 30) (metallized); Setacyl Yellow 3G (C.I. Disperse Yellow 20) (disperse); Cibacet Scarlet Br (C.I. Disperse Red 18) (disperse); Setacyl Brill. Blue BG (C.I. Disperse Blue 3) (disperse).

Example 3

The following reactants were introduced into a 1-liter three-neck flask provided with an agitator, a thermometer and a reflux condenser:

Hydroquinone (0.3 mol) _____ g__ 33
Anhydrous piperazine (1 mole) _____ g__ 86.1
Methanol _____ cc__ 360

120.25 g. (1.3 mols) of epichlorohydrin were added dropwise within 1 hour and the reaction mixture heated to 65° C. for 10 hours, while adding 52 g. (1.3 mols) of NaOH during the last 8 hours of heating. Sodium chloride was separated by filtration, methanol was removed from the filtrate by distillation and the polycondensate was then dried by heating at 100–110° C. under vacuum (1–2 mm. Hg). The resinous product thus obtained, after grinding and sieving, had a powdery appearance.

Analysis gave the following results: Nitrogen (found) 14.1%, (calculated) 14.58%.

41 g. of the ground product were mixed with 0.955 g. of polypropylene, 3 g. of calcium stearate and 1 g. of TiO$_2$ at room temperature in a Henschel type mixer. The polypropylene used had the following characteristics:

$[\eta]$ _____ 1.54
Ash content _____ percent__ 0.012
Residue after heptane extraction _____ do____ 97.2

The mix obtained was granulated in an extruder under an oxygen-free atmosphere at 220° C. The granulate was spun in a melt spinning device under the following conditions.

Spinning conditions:
  Screw temperature, ° C. _____ 250
  Head temperature, ° C. _____ 250
  Spinneret temperature, ° C. _____ 250
  Spinneret type, mm. _____ 60/0.8 x 16
  Max. pressure (kg./cm.$^2$) _____ 52
  Winding speed (m./minute) _____ 520
Stretching conditions:
  Temperature, ° C. _____ 120
  Medium _____ Steam
  Stretching ratio _____ 1:3

After stretching and treatment with a 6% aqueous ethylene-glycol diglycidyl ether solution followed by heating to 140° C. for 10 minutes, the fibers had the following characteristics:

Tenacity (g./den.) _____ 5.01
Elongation (percent) _____ 37

The fibers were dyeable with various dyestuffs, such as: Alizarine Yellow 2G (C.I. Mordant Yellow 1) (acid); Wool Red B (C.I. Acid Red 115) (acid); Alizarine Red S (C.I. Mordant Red 3) (acid); Alizarine Blue SE (C.I. Acid Blue 43) (acid); Acid Black JVS (C.I. Acid Black 1) (acid); Lanasyn Yellow GLN (C.I. Acid Yellow 112) (metallized); Lanasyn Red 2GL (C.I. Acid Red 216) (metallized); Lanasyn Brown 2RL (C.I. Acid Brown 30) (metallized); Setacyl Yellow 3G (C.I. Disperse Yellow 20) (disperse); Cibacet Scarlet Br (C.I. Disperse Red 18) (disperse); Setacyl Brill. Blue BG (C.I. Disperse Blue 3) (disperse).

Variations can, of course, be made without departing from the spirit and scope of the invention.

Having thus described our invention, what we desire to secure by Letters Patent and hereby claim is:

1. A dye receptive polymeric composition comprising a polypropylene consisting essentially of isotactic macromolecules and 1–25% by weight based on the weight of the polypropylene of a basic nitrogen polycondensate of epichlorohydrin with a bis-secondary amine and a diphenolic compound in a molar ratio of epichlorohydrin to polyamine plus diphenol of about 0.9:1 to 1:0.9, the ratio of polyamine to diphenol being from about 1:9 to 9:1.

2. The composition of claim 1 wherein the bis-secondary amine is piperazine or a dialkylalkylendiamine.

3. The composition of claim 1 wherein the diphenolic compound is selected from the group consisting of pyrocatechol, resorcinol, hydroquinone di-(p-hydroxyphenyl) methane and di-(p-hydroxyphenyl)dimethylmethane.

4. The composition of claim 2 wherein the diphenolic compound is selected from the group consisting of pyrocatechol, resorcinol, hydroquinone di-(p-hydroxyphenyl) methane and di-(p-hydroxyphenyl)dimethylmethane.

5. The composition of claim 1 wherein the bis-secondary amine is piperazine and the diphenolic compound is di-(p-hydroxyphenyl)dimethylmethane.

6. The composition of claim 1 in the form of mono- and multifilaments, simple or bulk staple or yarns, films, tapes or shaped articles.

7. A process for preparing dye receptive fibers which comprises extruding the composition of claim 1 in the molten state and stretching the fibers.

References Cited

UNITED STATES PATENTS 3,294,864  12/1966  Karoly _____ 260—837

FOREIGN PATENTS 644,271  1/1952  Great Britain.

SAMUEL H. BLECH, Primary Examiner.

PAUL LIEBERMAN, Assistant Examiner.

U.S. Cl. X.R.

8—55; 260—2, 41, 47, 836